United States Patent
Li et al.

(10) Patent No.: US 9,560,175 B2
(45) Date of Patent: Jan. 31, 2017

(54) METHOD FOR OBTAINING INTERNET PROTOCOL HEADER REPLACEMENT MAPPING AND NETWORK NODE

(71) Applicant: HUAWEI TECHNOLOGIES CO., LTD., Shenzhen (CN)

(72) Inventors: Yue Li, Shenzhen (CN); Wei Guo, Shenzhen (CN); Xiaolong Guo, Beijing (CN); Song Zhu, Beijing (CN)

(73) Assignee: HUAWEI TECHNOLOGIES CO., LTD., Suwon-si (KR)

( * ) Notice: Subject to any disclaimer, the term of this patent is extended or adjusted under 35 U.S.C. 154(b) by 68 days.

(21) Appl. No.: 14/310,428

(22) Filed: Jun. 20, 2014

(65) Prior Publication Data
US 2014/0314088 A1    Oct. 23, 2014

Related U.S. Application Data

(63) Continuation of application No. PCT/CN2012/086493, filed on Dec. 13, 2012.

(30) Foreign Application Priority Data

Dec. 20, 2011 (CN) .......................... 2011 1 0430097

(51) Int. Cl.
*H04L 29/06* (2006.01)
*H04W 28/06* (2009.01)
*H04W 80/04* (2009.01)

(52) U.S. Cl.
CPC .............. *H04L 69/22* (2013.01); *H04W 28/06* (2013.01); *H04W 80/04* (2013.01)

(58) Field of Classification Search
CPC ....................................................... H04L 69/22
See application file for complete search history.

(56) References Cited

U.S. PATENT DOCUMENTS 6,845,100 B1 * 1/2005 Rinne .................... H04L 47/10
  370/395.43
6,934,288 B2 * 8/2005 Dempo .................. H04L 29/06
  370/394

(Continued)

FOREIGN PATENT DOCUMENTS

CN    101136906 A    3/2008
CN    101163095 A    4/2008

(Continued)

OTHER PUBLICATIONS

Extended European Search Report dated Oct. 15, 2014 in related European Patent Application No. 12859257.3 (5 pages).

(Continued)

*Primary Examiner* — Rasheed Gidado
(74) *Attorney, Agent, or Firm* — Staas & Halsey LLP

(57) ABSTRACT

The present invention discloses a method for obtaining an Internet protocol header replacement mapping, which belong to the field of communications technologies. The method includes: obtaining, by a network node, fixed IP header information which is bound to a UE, where the network node is an MME or an eNB or a PGW or an SGW; establishing an IP header replacement mapping according to the fixed IP header information, where the IP header replacement mapping is correspondence between the fixed IP header information and an index or a bearer; and performing data transmission with the UE according to the IP header replacement mapping. In the present invention, the network node establishes the IP header replacement mapping according to the obtained fixed IP header information which is bound to the UE, the method is more flexible.

20 Claims, 9 Drawing Sheets

(56) References Cited

U.S. PATENT DOCUMENTS

| | | | |
|---|---|---|---|
| 7,215,667 B1 * | 5/2007 | Davis | H04L 12/4633 370/389 |
| 8,331,363 B2 * | 12/2012 | Sato | H04L 69/04 370/389 |
| 8,588,138 B2 * | 11/2013 | Ho | H04W 28/06 370/328 |
| 8,599,878 B2 * | 12/2013 | Wu | H04W 28/06 370/392 |
| 8,649,315 B2 * | 2/2014 | Kang | H04B 7/2606 370/315 |
| 8,711,883 B2 * | 4/2014 | Kang | H04L 65/605 370/389 |
| 8,848,665 B2 * | 9/2014 | Yano | H04L 45/50 370/331 |
| 2008/0317052 A1 | 12/2008 | Cai | |
| 2009/0213798 A1 * | 8/2009 | Li | H04L 29/12801 370/328 |
| 2012/0155375 A1 | 6/2012 | Zhu | |

FOREIGN PATENT DOCUMENTS

| | | |
|---|---|---|
| CN | 101998511 A | 3/2011 |
| EP | 2063599 A1 | 5/2009 |
| WO | WO 2011/150776 A1 | 12/2011 |

OTHER PUBLICATIONS

PCT International Search Report (ISR) and Written Opinion; PCT Forms PCT/ISA/210, PCT/ISA/220, and PCT/ISA/237 dated Nov. 3, 2013 in corresponding PCT Application No. PCT/CN2012/086493 (11 pages).

* cited by examiner

METHOD FOR OBTAINING INTERNET
PROTOCOL HEADER REPLACEMENT
MAPPING AND NETWORK NODE

CROSS-REFERENCE TO RELATED
APPLICATIONS

This application is a continuation of International Application No. PCT/CN2012/086493, filed on Dec. 13, 2012, which claims priority to Chinese Patent Application No. 201110430097.6, filed on Dec. 20, 2011, both of which are hereby incorporated by reference in their entireties.

TECHNICAL FIELD

The present invention relates to the field of communications technologies, and in particular, to a method for obtaining an Internet protocol header replacement mapping and a network node.

BACKGROUND

With wide applications of the Internet of Things, the number of users accessing the network continuously grows. During data transmission between objects based on IP (Internet Protocol, Internet protocol), overheads produced an IP header in the communication data are huge, resulting in extremely low user plane transmission efficiency. Therefore, by establishing a replacement mapping between the IP header and an index and replacing the IP header with a corresponding index, applications of performing data transmission according to the index of the IP header emerge as required.

In the prior art, an IP header replacement mapping is configured by an MTC (Machine Type Communication, machine type communication) server or manually configured to an eNB (evolved Node B, evolved base station), and the eNB maintains the IP header replacement mapping and performs data transmission with a UE (User Equipment, user equipment) according to the IP header replacement mapping.

In the implementation of the present invention, the inventor finds that the prior art at least has the following problems:

In the prior art, because the IP header replacement mapping obtained by the eNB is configured by the MTC server or manually configured, this manner for obtaining an IP header replacement mapping is inflexible and not easy to update or maintain; moreover, in a current network, no direct interface exists between the eNB and the MTC server, so that it is rather difficult to configure and maintain the mapping table.

SUMMARY

To improve the flexibility in obtaining the IP header replacement mapping and reducing the difficulty in configuring and maintaining the IP header replacement mapping, embodiments of the present invention provide a method for obtaining an Internet protocol header replacement mapping and a network node. The technical solutions are as follows:

In one aspect, a method for obtaining an Internet protocol header replacement mapping is provided, which includes:

obtaining, by a network node, fixed Internet protocol IP header information which is bound to a user equipment UE, where the network node is a mobility management entity MME or an evolved base station eNB or a packet data network gateway PGW or a serving gateway SGW;

establishing an IP header replacement mapping according to the fixed IP header information, where the IP header replacement mapping is correspondence between the fixed IP header information and an index or a bearer; and performing data transmission with the UE according to the IP header replacement mapping.

In another aspect, a network node is further provided, where the network node is a mobility management entity MME or an evolved base station eNB or a packet data network gateway PGW or a serving gateway SGW, and includes:

an obtaining module, configured to obtain fixed Internet protocol IP header information which is bound to a user equipment UE;

an establishing module, configured to establish an IP header replacement mapping according to the fixed IP header information obtained by the obtaining module, where the IP header replacement mapping is correspondence between the fixed IP header information and an index or a bearer; and a communication module, configured to perform data transmission with the UE according to the IP header replacement mapping established by the establishing module.

The technical solutions provided by the embodiments of the present invention have the following beneficial effects:

The network node establishes the IP header replacement mapping according to the obtained fixed IP header information which is bound to the UE, which, compared with an existing manner of configuring the mapping by an MTC server or manually, is more flexible and can reduce difficulty in configuring and maintaining the IP header replacement mapping; moreover, by expanding an entity for maintaining the IP header replacement mapping from an eNB in the prior art to a network node such as an eNB, or an MME, or a PGW, or an SGW, flexibility in obtaining the IP header replacement mapping is further improved and the implementation manner becomes more universal.

BRIEF DESCRIPTION OF DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

In order to make the objectives, technical solutions, and advantages of the present invention more comprehensible, embodiments of the present invention are described in further detail below with reference to the accompanying drawings.

Embodiment 1

Figure 1:
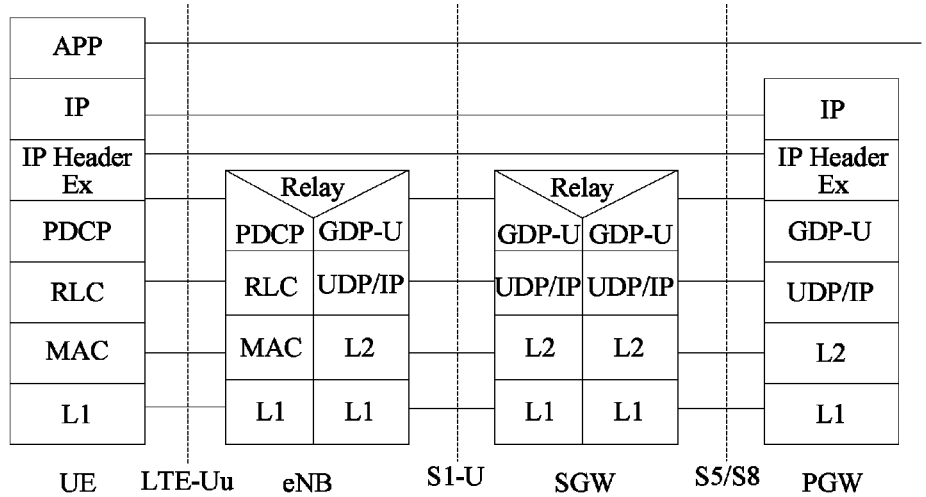
FIG. 1 is a schematic structural diagram of a protocol layer of a network node according to Embodiment 1 of the present invention.
Figure 2:
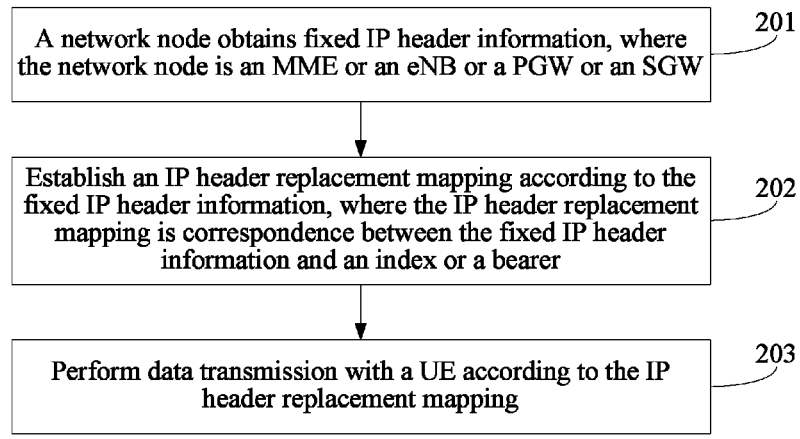
FIG. 2 is a flow chart of a method for obtaining an Internet protocol header replacement mapping according to Embodiment 1 of the present invention.

This embodiment provides a method for obtaining an Internet protocol header replacement mapping. FIG. 1 is a schematic structural diagram of a protocol layer of a network node. In the method provided by this embodiment, a network node for obtaining an IP header replacement mapping is expanded from a single eNB to an eNB or an MME (Mobility Management Entity, mobility management entity) or a PGW (Packet Data Network Gateway, packet data network gateway) or an SGW (Serving Gateway, serving gateway), so as to improve flexibility in obtaining the IP header replacement mapping. As shown in FIG. 1, when IP packet header recovery needs to be executed in the PGW, an IP compression layer may be provided on a PDCP (Packet Data Convergence Protocol, packet data convergence protocol) layer of a UE, and a peer end of the layer is in the PGW and executes IP header replacement/compression and recovery functions. Similarly, an IP compression layer of the peer end may also be located on the PDCP layer of the eNB, so that the IP header replacement/compression process is completed between the UE and the eNB. The IP compression layer of the peer end may also be located in the MME, and when a CP is used for data transmission between the UE and the MME, the IP header replacement/compression process is completed between the UE and the MME. In combination with the structure of the protocol layer of the network node shown in FIG. 1, referring to FIG. 2, a procedure of the method provided by this embodiment is specifically as follows:

201: A network node obtains fixed IP header information which is bound to a UE, where the network node is an MME or an eNB or a PGW or an SGW.

202: Establish an IP header replacement mapping according to the fixed IP header information, where the IP header replacement mapping is correspondence between the fixed IP header information and an index or a bearer.

203: Perform data transmission with the UE according to the IP header replacement mapping.

When the network node is an MME or an eNB, the obtaining the fixed IP header information which is bound to the UE includes:

obtaining, from the UE or an HSS (Home Subscriber Server, home subscriber server), the fixed IP header information which is bound to the UE.

Alternatively, when the network node is a PGW or an SGW or an eNB, the obtaining the fixed IP header information which is bound to the UE includes:

receiving the fixed IP header information sent by an MME after the MME obtains, from the UE or an HSS, the fixed IP header information which is bound to the UE.

Further, the obtaining, from the UE, the fixed IP header information which is bound to the UE includes:

when the UE initiates an attach request or a dedicated bearer setup process, obtaining, from the UE, the fixed IP header information which is bound to the UE.

Further, the obtaining, from the UE, the fixed IP header information which is bound to the UE includes:

receiving fixed IP header information which is bound to the UE and actively reported by the UE, or after querying the UE, receiving fixed IP header information which is bound to the UE and reported by the UE.

Specifically, when the network node is an MME, the performing data transmission with the UE according to the IP header replacement mapping includes:

sending the IP header replacement mapping to another network node, so that the another network node performs data transmission with the UE according to the IP header replacement mapping.

Optionally, when the IP header replacement mapping is correspondence between the fixed IP header information and an index, the performing data transmission with the UE according to the IP header replacement mapping includes:

sending the IP header replacement mapping to the UE, and receiving a data packet sent by the UE after the UE replaces the corresponding fixed IP header information with the index in the IP header replacement mapping; and querying the IP header replacement mapping according to the index in the data packet sent by the UE, to obtain the fixed IP header information corresponding to the data packet sent by the UE.

Further, after the obtaining the fixed IP header information corresponding to the data packet sent by the UE, the method further includes:

recovering the index in the data packet sent by the UE to the corresponding fixed IP header information, and forwarding the fixed IP header information to another network node.

Optionally, when the IP header replacement mapping is correspondence between the fixed IP header information and an index, the performing data transmission with the UE according to the IP header replacement mapping includes:

sending the IP header replacement mapping to the UE, and sending, to the UE, a data packet where the corresponding fixed IP header information is replaced with the index in the IP header replacement mapping, so that the UE queries the IP header replacement mapping according to the index in the received data packet, to obtain the fixed IP header information corresponding to the received data packet.

Optionally, when the IP header replacement mapping is correspondence between the fixed IP header information and a bearer, the performing data transmission with the UE according to the IP header replacement mapping includes:

indicating, according to the IP header replacement mapping, a bearer for the UE to send data, and receiving a data packet which is sent by the UE on the indicated bearer and has no fixed IP header information added; and querying the IP header replacement mapping according to the bearer for the UE to send the data packet, to obtain the fixed IP header information corresponding to the data packet sent by the UE.

Further, after the obtaining the fixed IP header information corresponding to the data packet sent by the UE, the method further includes:

adding the corresponding fixed IP header information in the data packet sent by the UE, and forwarding the data packet to another network node.

In the method provided by this embodiment, the network node establishes the IP header replacement mapping according to the obtained fixed IP header information which is bound to the UE, so, compared with an existing manner of configuring the mapping by an MTC server or manually, the method is more flexible and can reduce difficulty in configuring and maintaining the IP header replacement mapping; moreover, by expanding an entity for maintaining the IP header replacement mapping from an eNB in the prior art to a network node such as an eNB, or an MME, or a PGW, or an SGW, flexibility in obtaining the IP header replacement mapping is further improved and the implementation manner becomes more universal.

Regarding different network nodes and technical means for obtaining an IP header replacement mapping, to more clearly illustrate the method provided by Embodiment 1, the content in Embodiment 2 to Embodiment 5 is taken as examples to describe in detail the method provided in Embodiment 1. The details are shown in Embodiment 2 to Embodiment 5 as follows:

Embodiment 2

Figure 3:
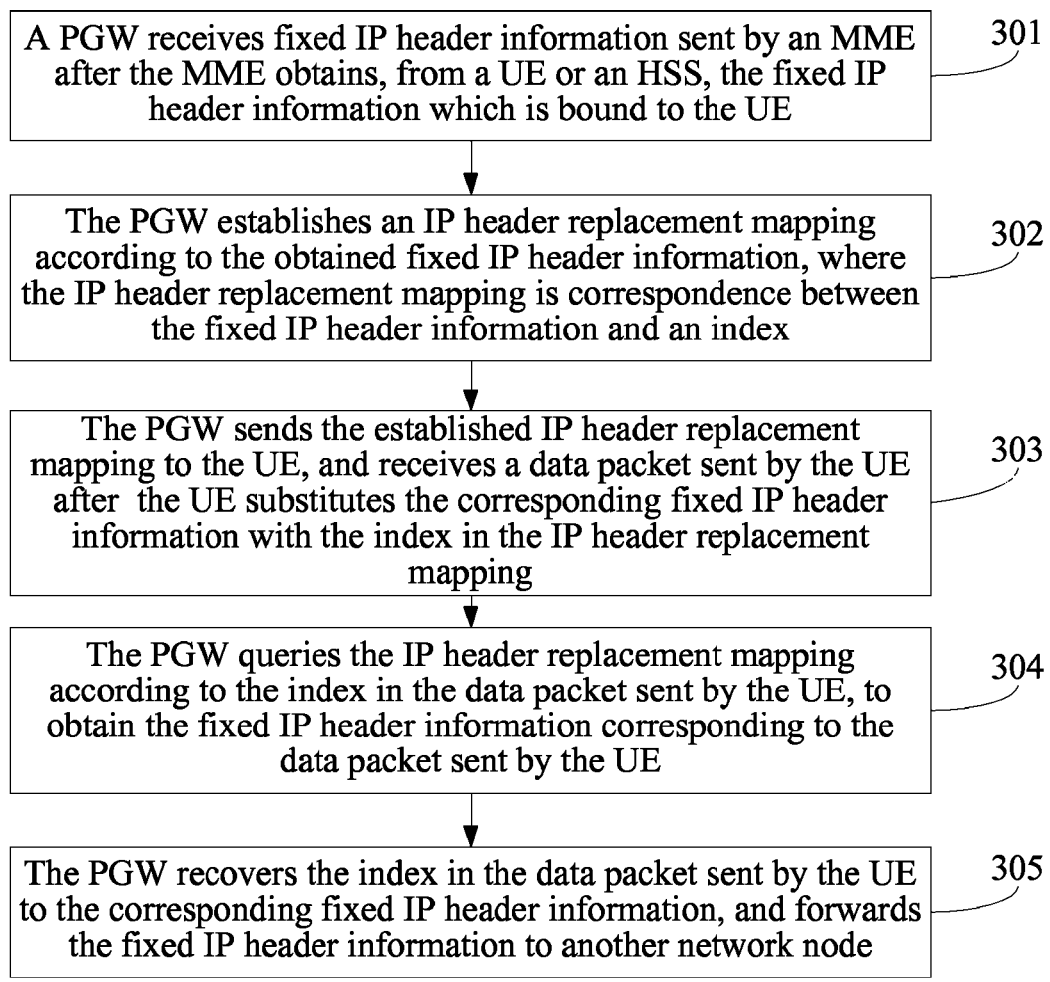
FIG. 3 is a flow chart of a method for obtaining an Internet protocol header replacement mapping according to Embodiment 2 of the present invention.

This embodiment provides a method for obtaining an Internet protocol header replacement mapping, and based on Embodiment 1, for ease of illustration, it is taken as an example in this embodiment that a PGW receives fixed IP header information sent by an MME and establishes an IP header replacement mapping, where the established IP header replacement mapping is correspondence between the fixed IP header information and an index, so as to illustrate in detail the method provided by this embodiment. Referring to FIG. 3, a procedure of the method provided by this embodiment is specifically as follows:

301: A PGW receives fixed IP header information sent by an MME after the MME obtains, from a UE or an HSS, the fixed IP header information which is bound to the UE.

In this step, specific content of the fixed IP header information which is bound to the UE and obtained by the MME from the UE or HSS is not limited in this embodiment, and in an actual application, the fixed IP header information may be a fixed part of content in an IP packet header of an APN (Access Point Name, access point name) which is bound to the UE, where the fixed part of content includes, but not limited to, information such as a version, header length, service type, time to live, source IP address and destination IP address.

Further, when obtaining, from the UE, the fixed IP header information which is bound to the UE, the MME may receive the fixed IP header information which is bound to the UE and actively reported by the UE, or after querying the UE, receive the fixed IP header information which is bound to the UE and reported by the UE. This embodiment is not specifically limited thereto.

302: The PGW establishes an IP header replacement mapping according to the obtained fixed IP header information, where the IP header replacement mapping is correspondence between the fixed IP header information and an index.

Specifically, the IP header replacement mapping established by the PGW according to the obtained fixed IP header information is correspondence between the fixed IP header information and an index. The IP header replacement mapping is established so that an index of a small overhead can be used to replace the fixed IP header information of a large overhead for data transmission in a subsequent communication process, thereby reducing the overhead and improving user plane data transmission efficiency. Therefore, this embodiment does not limit the specific index corresponding to the fixed IP header information, as long as the overhead of the index that is induced is ensured to be smaller than that of the fixed IP header information. In an actual application, for different bearers, fixed IP information may be different. In this case, if the PGW obtains different fixed IP information, different IP header replacement mappings may be established according to the obtained fixed IP header information, and to facilitate subsequent communication with corresponding UEs according to the different IP header replacement mappings, the PGW may store the established IP header replacement mapping in the form of a list, or store the established IP header replacement mapping in other forms. This embodiment does not limit the manner of establishing and storing the IP header replacement mapping by the PGW.

303: The PGW sends the established IP header replacement mapping to the UE, and receives a data packet sent by the UE after the UE replaces the corresponding fixed IP header information with the index in the IP header replacement mapping.

In this step, after the PGW sends the established IP header replacement mapping to the UE, for different bearers, fixed IP information may be different, and therefore, IP header replacement mappings sent by the PGW and received by the UE may also be different. In this case, to facilitate subsequent communication with corresponding network nodes according to the different IP header replacement mappings, the UE may store the received IP header replacement mapping in the form of a list, or store the received IP header replacement mapping in other forms. This embodiment does not limit the manner of storing the IP header replacement mapping by the UE.

After the UE receives the IP header replacement mapping sent by the PGW, the UE may obtain an index corresponding to the fixed IP header information according to the IP header replacement mapping, and replace the fixed IP header information of a large overhead with an index of a small overhead for data transmission, thereby reducing the overhead and improving the user plane data transmission efficiency. In addition, the method provided by this embodiment also supports a data compression manner, and this embodiment does not limit the specific compression manner adopted herein, for example, after substituting the corresponding fixed IP header information with the index in the IP header replacement mapping, the UE adopts a PDCP compression technology to compress a data packet to be sent, and sends the compressed data packet to the PGW, thereby further reducing the overhead and improving the user plane data transmission efficiency.

304: The PGW queries the IP header replacement mapping according to the index in the data packet sent by the UE, to obtain the fixed IP header information corresponding to the data packet sent by the UE.

Because the index in the data packet sent by the UE is obtained based on the IP header replacement mapping established by the PGW, after receiving the data packet sent by the UE, the PGW may query the IP header replacement mapping according to the index in the data packet sent by the UE, to obtain the fixed IP header information corresponding to the data packet sent by the UE. If the UE compresses the data packet in step 303, the PGW further needs to decompress the received data packet. This embodiment does not limit the specific decompression manner.

305: The PGW recovers the index in the data packet sent by the UE to the corresponding fixed IP header information, and forwards the fixed IP header information to another network node.

In this step, when sending the data packet, the UE replaces the corresponding fixed IP header information with the index in the IP header replacement mapping, and only the PGW and the UE side have the IP header replacement mapping. Therefore, to enable another network node to learn the fixed IP header information corresponding to the data packet sent by the UE, before forwarding the data packet sent by the UE to the another network node, the PGW needs to recover the index in the data packet sent by the UE to the corresponding fixed IP header information, and then forward the fixed IP header information to the another network node. This embodiment does not specifically limit the another network node.

Moreover, in the method provided by this embodiment, after sending the established IP header replacement mapping to the UE, the PGW can not only implement uplink data transmission by performing step 303 to step 305, but also can perform downlink data transmission. For example, the PGW sends the established IP header replacement mapping to the UE, and sends, to the UE, a data packet where the corresponding fixed IP header information is replaced with the index in the IP header replacement mapping, so that the UE queries the IP header replacement mapping according to the index in the received data packet, to obtain the fixed IP header information corresponding to the received data packet. In the data transmission manner, the PGW may perform data compression, and the UE performs data decompression.

Figure 4:
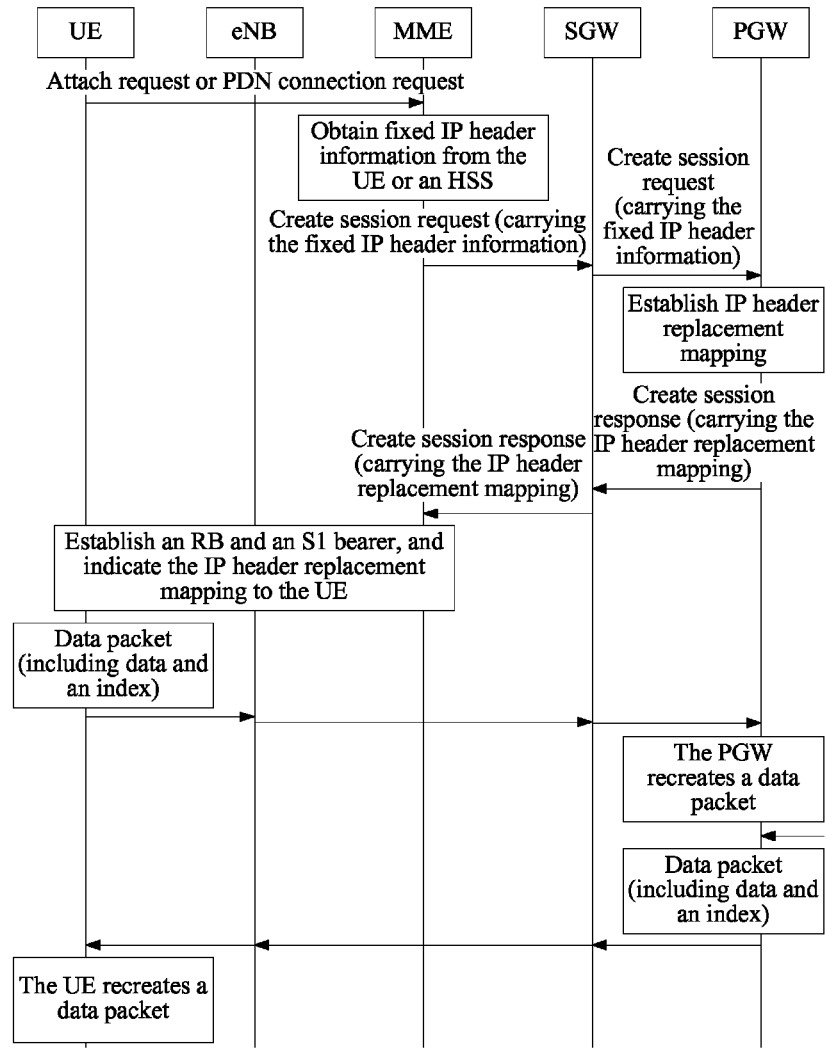
FIG. 4 is a schematic diagram of interaction between network nodes according to Embodiment 2 of the present invention.
Figure 5:
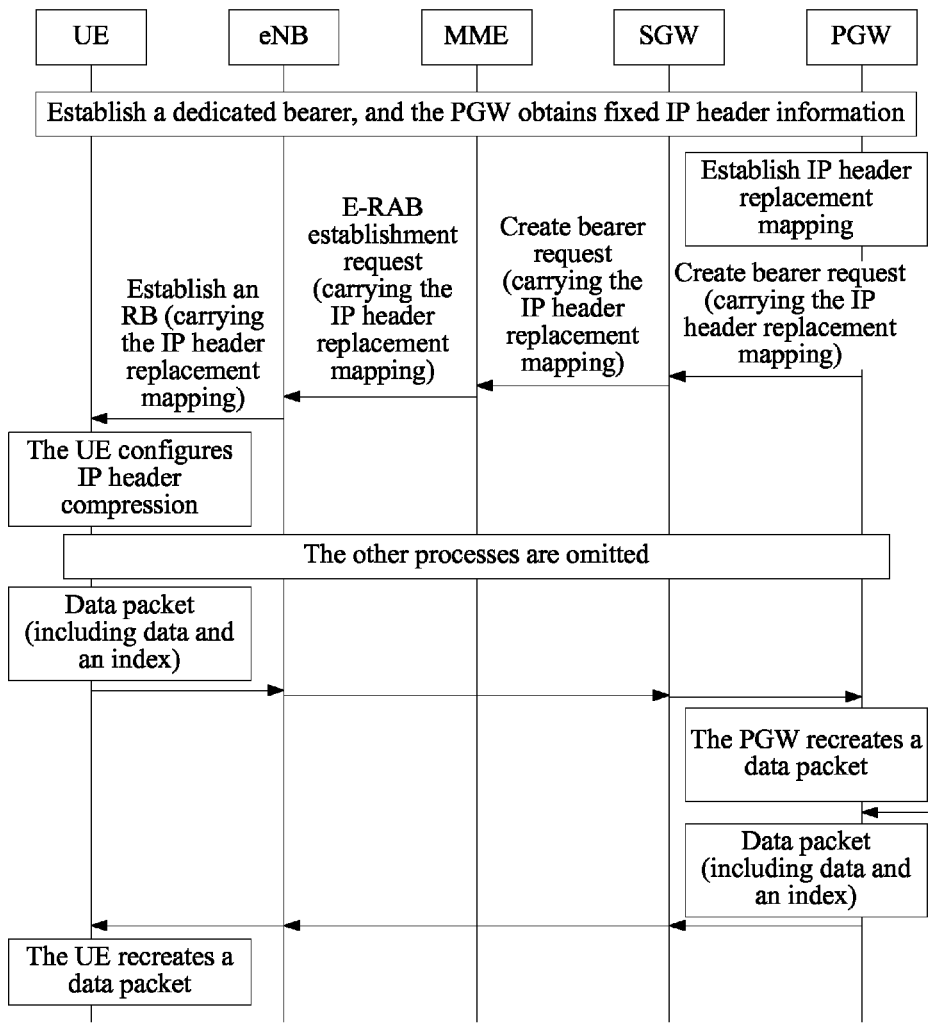
FIG. 5 is another schematic diagram of interaction between network nodes according to Embodiment 2 of the present invention.

It should be noted that, the foregoing method may be implemented based on a UE attach process, that is, when obtaining the fixed IP header information which is bound to the UE, the MME may obtain, from the UE, the fixed IP header information which is bound to the UE, when the UE initiates an attach request; for this scenario, an interaction process between the network nodes may be shown in FIG. 4. Optionally, in addition to the UE attach process, the foregoing method may also be implemented based on another process, for example, based on a dedicated bearer setup process, so that when obtaining the fixed IP header information which is bound to the UE, the MME may obtain, from the UE and in the dedicated bearer process, the fixed IP header information which is bound to the UE; for this scenario, an interaction process between the network nodes may be shown in FIG. 5.

Further, in addition to the PGW, the network node which establishes the IP header replacement mapping according to the fixed IP header information which is bound to the UE and sent by the MME, and performs data transmission with the UE according to the established IP header replacement mapping may also be an eNB or an SGW, the implementation process of which is similar to the method provided by this embodiment, so the details are not repeated herein.

In the method provided by this embodiment, the network node establishes the IP header replacement mapping according to the obtained fixed IP header information which is bound to the UE, so, compared with an existing manner of configuring the mapping by an MTC server or manually, the method is more flexible and can reduce difficulty in configuring and maintaining the IP header replacement mapping; moreover, by expanding an entity for maintaining the IP header replacement mapping from an eNB in the prior art to a network node such as a PGW or an eNB or an SGW, flexibility in obtaining the IP header replacement mapping is further improved and the implementation manner becomes more universal.

Embodiment 3

Figure 6:
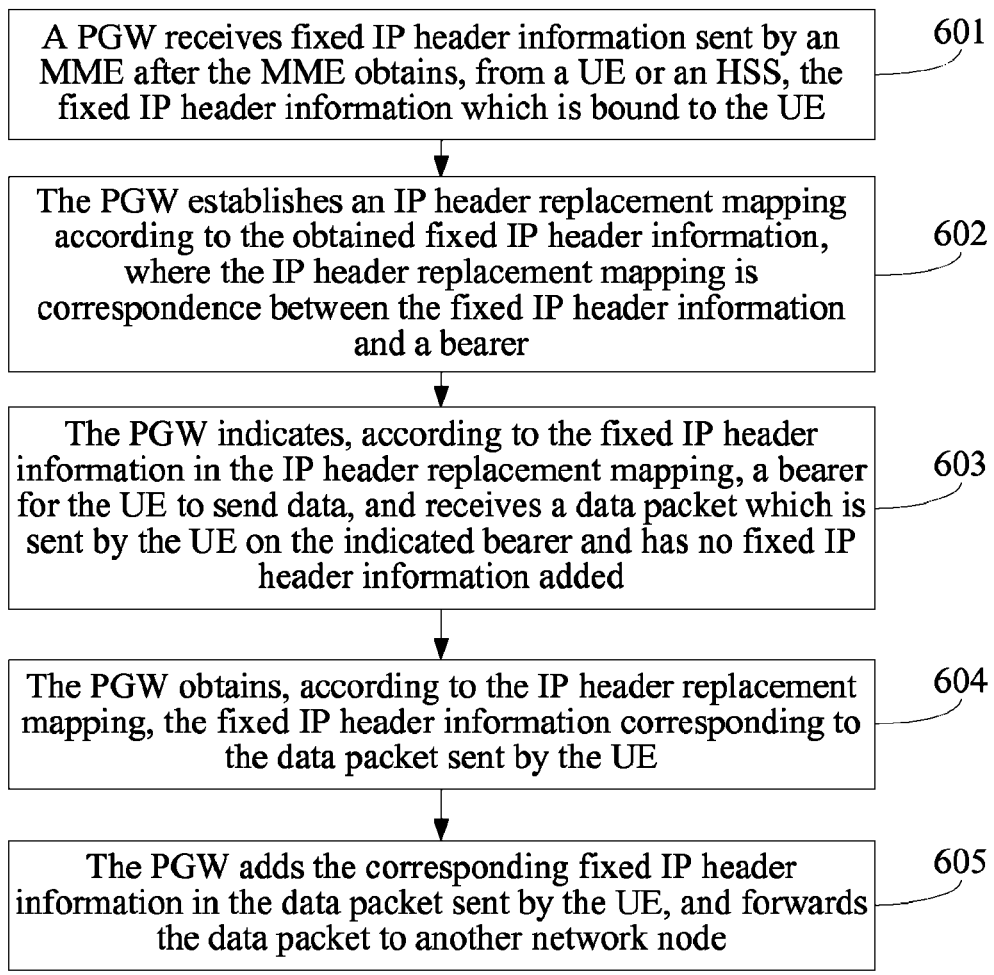
FIG. 6 is a flow chart of a method for obtaining an Internet protocol header replacement mapping according to Embodiment 3 of the present invention.

This embodiment provides a method for obtaining an Internet protocol header replacement mapping, and based on Embodiment 1, for ease of illustration, it is taken as an example in this embodiment that a PGW receives fixed IP header information sent by an MME and establishes an IP header replacement mapping, where the established IP header replacement mapping is correspondence between the fixed IP header information and a bearer, so as to illustrate in detail the method provided by this embodiment. Referring to FIG. 6, a procedure of the method provided by this embodiment is specifically as follows:

601: A PGW receives fixed IP header information sent by an MME after the MME obtains, from a UE or an HSS, the fixed IP header information which is bound to the UE.

In this step, for the specific content of the fixed IP header information which is bound to the UE and obtained by the MME from the UE or HSS and the specific obtaining manner thereof, reference may be made to step 301 in Embodiment 2, and the details are not repeated herein.

602: The PGW establishes an IP header replacement mapping according to the obtained fixed IP header information, where the IP header replacement mapping is correspondence between the fixed IP header information and a bearer.

Specifically, the IP header replacement mapping established by the PGW according to the obtained fixed IP header information is the correspondence between the fixed IP header information and the bearer. The IP header replacement mapping is established to enable the UE to send a data packet, containing no fixed IP header information, on an indicated bearer in the subsequent communication process, thereby reducing the overhead and improving the user plane data transmission efficiency. Therefore, this embodiment does not limit the specific bearer corresponding to the fixed IP header information. In an actual application, for different bearers, fixed IP information may be different. In this case, if the PGW obtains different fixed IP information, different IP header replacement mappings may be established according to the obtained fixed IP header information, and to facilitate subsequent communication with corresponding UEs according to the different IP header replacement mappings, the PGW may store the established IP header replacement mapping in the form of a list, or store the established IP header replacement mapping in other forms. This embodiment does not limit the manner of establishing and storing the IP header replacement mapping by the PGW.

603: The PGW indicates, according to the IP header replacement mapping, a bearer for the UE to send data, and receives a data packet which is sent by the UE on the indicated bearer and has no fixed IP header information added.

In this step, after establishing the IP header replacement mapping, the PGW does not adopt a manner of feeding back the established IP header replacement mapping to the UE, but only indicates a bearer for the UE to send data, so that the UE sends, on the indicated bearer, a data packet that has no fixed IP header information added, which also achieves the purpose of saving the overhead and increasing a transmission rate. In addition, the method provided by this embodiment also supports a data compression manner, and this embodiment does not limit the specific compression manner adopted herein, for example, the UE adopts a PDCP compression technology to compress a data packet to be sent, and sends, on the indicated bearer, the compressed data packet to the PGW, thereby further reducing the overhead and improving the user plane data transmission efficiency.

604: The PGW queries the IP header replacement mapping according to the bearer for the UE to send the data packet, to obtain the fixed IP header information corresponding to the data packet sent by the UE.

Specifically, because the data packet sent by the UE is sent on the bearer indicated by the PGW, the PGW can determine the fixed IP header information corresponding to the bearer when indicating the bearer to the UE, and therefore, when the PGW receives the data packet sent by the UE on the indicated bearer, the PGW queries the IP header replacement mapping according to the bearer for the UE to send the data packet, to determine and obtain the fixed IP header information corresponding to the data packet sent by the UE. If the UE compresses the data packet in step 603, the PGW further needs to decompress the received data packet. This embodiment does not limit the specific decompression manner.

It should be noted that, to ensure the correspondence between the bearer indicated by the PGW to the UE and the fixed IP header information, the method provided by this embodiment is applicable to a case that one bearer merely sends data to the same IP address.

605: The PGW adds the corresponding fixed IP header information in the data packet sent by the UE, and forwards the data packet to another network node.

In this step, after the PGW determines the fixed IP header information corresponding to the data packet sent by the UE, to enable another network node to learn the fixed IP header information corresponding to the data packet sent by the UE, before forwarding the data packet sent by the UE to the another network node, the PGW needs to add the corresponding fixed IP header information in the data packet sent by the UE, and then forward the data packet to the another network node. This embodiment does not specifically limit the another network node.

It should be noted that, the foregoing method may be implemented based on a UE attach process, that is, when obtaining the fixed IP header information which is bound to the UE, the MME may obtain, from the UE, the fixed IP header information which is bound to the UE, when the UE initiates an attach request. Optionally, in addition to the UE attach process, the foregoing method may also be implemented based on another process, for example, based on a dedicated bearer setup process, so that when obtaining the fixed IP header information which is bound to the UE, the MME may obtain, from the UE and in the dedicated bearer process, the fixed IP header information which is bound to the UE.

Further, in addition to the PGW, the network node which establishes the IP header replacement mapping according to the fixed IP header information which is bound to the UE and sent by the MME, and performs data transmission with the UE according to the established IP header replacement mapping may also be an eNB or an SGW, the implementation process of which is similar to the method provided by this embodiment, so the details are not repeated herein.

In the method provided by this embodiment, the network node establishes the IP header replacement mapping according to the obtained fixed IP header information which is bound to the UE, so, compared with an existing manner of configuring the mapping by an MTC server or manually, the method is more flexible and can reduce difficulty in configuring and maintaining the IP header replacement mapping; moreover, by expanding an entity for maintaining the IP header replacement mapping from an eNB in the prior art to a network node such as a PGW or an eNB or an SGW, flexibility in obtaining the IP header replacement mapping is further improved and the implementation manner becomes more universal.

Embodiment 4

Figure 7:
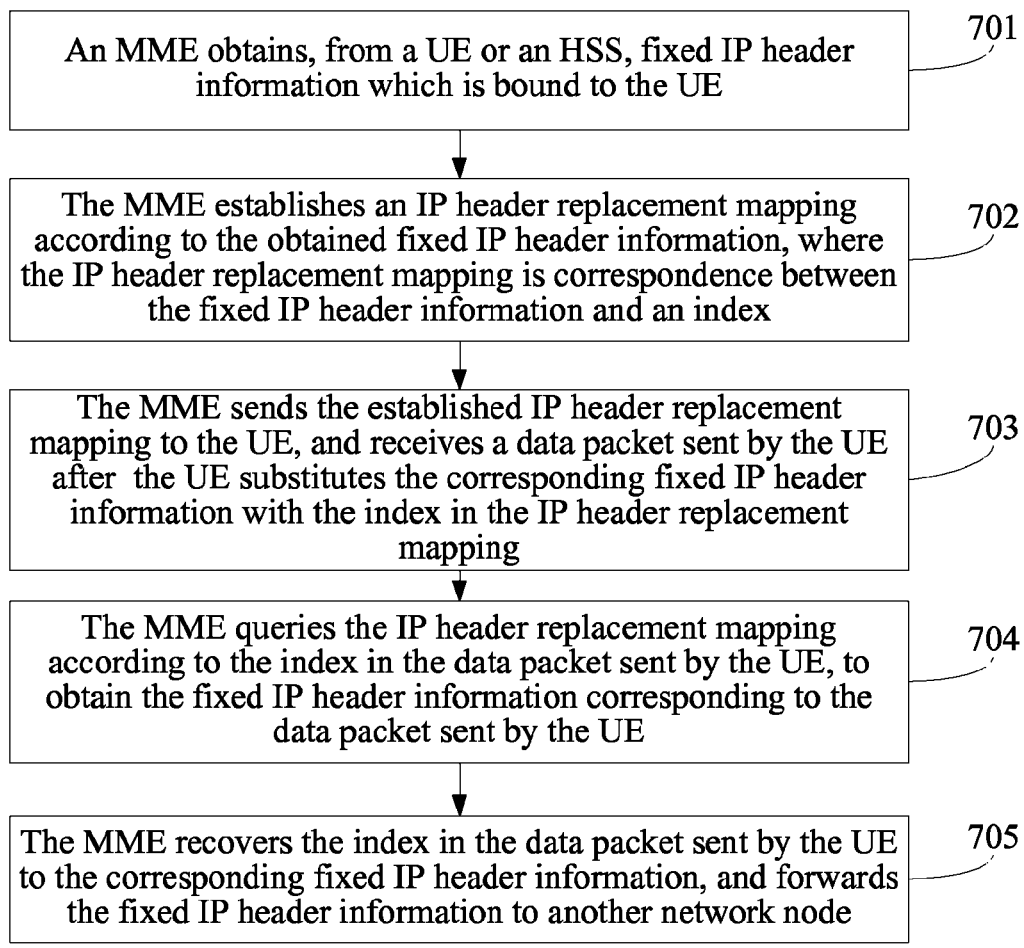
FIG. 7 is a flow chart of a method for obtaining an Internet protocol header replacement mapping according to Embodiment 4 of the present invention.

This embodiment provides a method for obtaining an Internet protocol header replacement mapping, and based on Embodiment 1, for ease of illustration, it is taken as an example in this embodiment that an MME obtains, from a UE or an HSS, fixed IP header information which is bound to the UE and establishes an IP header replacement mapping, where the established IP header replacement mapping is correspondence between the fixed IP header information and an index, so as to illustrate in detail the method provided by this embodiment. Referring to FIG. 7, a procedure of the method provided by this embodiment is specifically as follows:

701: An MME obtains, from a UE or an HSS, fixed IP header information which is bound to the UE.

In this step, the manner that the MME obtains, from the UE or HSS, the fixed IP header information which is bound to the UE is the same as step 301 in Embodiment 2, and the details are not repeated herein.

702: The MME establishes an IP header replacement mapping according to the obtained fixed IP header information, where the IP header replacement mapping is correspondence between the fixed IP header information and an index.

Specifically, the IP header replacement mapping established by the MME according to the obtained fixed IP header information is the correspondence between the fixed IP header information and the index. The IP header replacement mapping is established so that an index of small overhead can be used to replace the fixed IP header information of large overhead for data transmission in the subsequent communication process, thereby reducing the overhead and improving the user plane data transmission efficiency. Therefore, this embodiment does not limit the specific index corresponding to the fixed IP header information, as long as the overhead of the the index that is induced is ensured to be smaller than that of the fixed IP header information. In an actual application, for different bearers, fixed IP information may be different. In this case, if the MME obtains different fixed IP information, different IP header replacement mappings may be established according to the obtained fixed IP header information, and to facilitate subsequent communication with corresponding UEs according to the different IP header replacement mappings, the MME may store the established IP header replacement mapping in the form of a list, or store the established IP header replacement mapping in other forms. This embodiment does not limit the manner of establishing and storing the IP header replacement mapping by the MME.

703: The MME sends the established IP header replacement mapping to the UE, and receives a data packet sent by the UE after the UE replaces the corresponding fixed IP header information with the index in the IP header replacement mapping.

In this step, after the MME sends the established IP header replacement mapping to the UE, for different bearers, fixed IP information may be different, and therefore, header replacement mappings sent by the MME and received by the UE may also be different. In this case, to facilitate subsequent communication with corresponding network nodes according to the different IP header replacement mappings, the UE may store the received IP header replacement mapping in the form of a list, or store the received IP header replacement mapping in other forms. This embodiment does not limit the manner of storing the IP header replacement mapping by the UE.

After the UE receives the IP header replacement mapping sent by the MME, the UE may obtain an index corresponding to the fixed IP header information according to the IP header replacement mapping, and replace the fixed IP header information of a large overhead with an index of a small overhead for data transmission, thereby reducing the overhead and improving the user plane data transmission efficiency. In addition, the method provided by this embodiment also supports a data compression manner, and this embodiment does not limit the specific compression manner adopted herein, for example, after substituting the corresponding fixed IP header information with the index in the IP header replacement mapping, the UE adopts a PDCP compression technology to compress a data packet to be sent, and sends the compressed data packet to the MME, thereby further reducing the overhead and improving the user plane data transmission efficiency.

704: The MME queries the IP header replacement mapping according to the index in the data packet sent by the UE, to obtain the fixed IP header information corresponding to the data packet sent by the UE.

Because the index in the data packet sent by the UE is obtained based on the IP header replacement mapping established by the MME, after receiving the data packet sent by the UE, the MME may query the IP header replacement mapping according to the index in the data packet sent by the UE, to obtain the fixed IP header information corresponding to the data packet sent by the UE. If the UE compresses the data packet in step 703, the MME further needs to decompress the received data packet. This embodiment does not limit the specific decompression manner.

705: The MME recovers the index in the data packet sent by the UE to the corresponding fixed IP header information, and forwards the fixed IP header information to another network node.

In this step, when sending the data packet, the UE replaces the corresponding fixed IP header information with the index in the IP header replacement mapping, and only the MME and the UE side have the IP header replacement mapping. Therefore, before forwarding the data packet sent by the UE, to enable another network node to learn the fixed IP header information corresponding to the data packet sent by the UE, the MME needs to recover the index in the data packet sent by the UE to the corresponding fixed IP header information, and then forward the fixed IP header information to the another network node. This embodiment does not specifically limit the another network node.

Moreover, in the method provided by this embodiment, after sending the established IP header replacement mapping to the UE, the MME can not only perform step 703 to step 705 to implement uplink data transmission, but also can perform downlink data transmission. For example, the MME sends the established IP header replacement mapping to the UE, and sends, to the UE, a data packet where the corresponding fixed IP header information is replaced with the index in the IP header replacement mapping, so that the UE queries the IP header replacement mapping according to the index in the received data packet, to obtain the fixed IP header information corresponding to the received data packet.

It should be noted that, the foregoing method may be implemented based on a UE attach process, that is, when obtaining the fixed IP header information which is bound to the UE, the MME may obtain, from the UE, the fixed IP header information which is bound to the UE, when the UE initiates an attach request. Optionally, in addition to the UE attach process, the foregoing method may also be implemented based on another process, for example, based on a dedicated bearer setup process, so that when obtaining the fixed IP header information which is bound to the UE, the MME may obtain, from the UE and in the dedicated bearer process, the fixed IP header information which is bound to the UE.

Further, in addition to the MME, the network node which establishes the IP header replacement mapping and performs data transmission with the UE according to the established IP header replacement mapping may also be an eNB, the implementation process of which is similar to the method provided by this embodiment, so the details are not repeated herein. If the network node that establishes the IP header replacement mapping is an eNB, when obtaining the fixed IP header information which is bound to the UE, the eNB can multiplex an existing RRC (Radio Resource Control, radio resource control) message or a new RRC message to carry the fixed IP header information, for example, an RRC connection setup complete message is used in the uplink, and an RRC connection reconfiguration message is used in the downlink.

Optionally, in the method provided by this embodiment, in addition to establishing the IP header replacement mapping, the MME can perform data transmission with the UE through the IP header replacement mapping and can also send the established IP header replacement mapping to another network node, so that the another network node performs data transmission with the UE according to the IP header replacement mapping established by the MME, and the MME does not need to recover the index in the data packet sent by the UE to the corresponding fixed IP header information and then forward the fixed IP header information to the another network node. When the another network node performs data transmission with the UE according to the IP header replacement mapping established by the MME, the specific implementation manner is similar to the execution process of the MME in step 703 to step 705 of this embodiment, and the details are not repeated herein.

In the method provided by this embodiment, the network node establishes the IP header replacement mapping according to the obtained fixed IP header information which is bound to the UE, so, compared with an existing manner of configuring the mapping by an MTC server or manually, the method is more flexible and can reduce difficulty in configuring and maintaining the IP header replacement mapping;

moreover, by expanding an entity for maintaining the IP header replacement mapping from an eNB in the prior art to a network node such as a PGW or an eNB or an SGW, flexibility in obtaining the IP header replacement mapping is further improved and the implementation manner becomes more universal.

Embodiment 5

Figure 8:
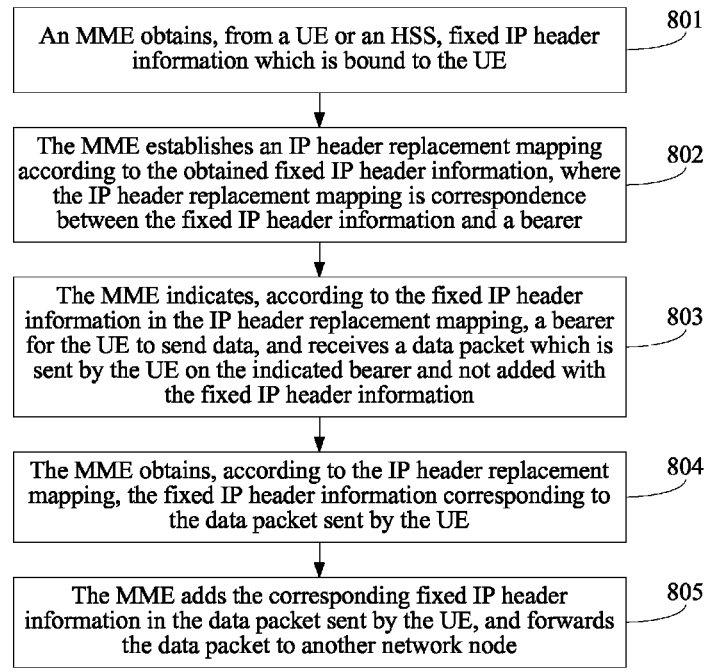
FIG. 8 is a flow chart of a method for obtaining an Internet protocol header replacement mapping according to Embodiment 5 of the present invention.

This embodiment provides a method for obtaining an Internet protocol header replacement mapping, and based on Embodiment 1, for ease of illustration, it is taken as an example in this embodiment that an MME obtains fixed IP header information which is bound to a UE and establishes an IP header replacement mapping, where the established IP header replacement mapping is correspondence between the fixed IP header information and a bearer, so as to illustrate in detail the method provided by this embodiment. Referring to FIG. 8, a procedure of the method provided by this embodiment is specifically as follows:

801: An MME obtains, from a UE or an HSS, fixed IP header information which is bound to the UE.

In this step, for the specific content of the fixed IP header information which is bound to the UE and obtained by the MME from the UE or HSS and the specific obtaining manner thereof, reference may be made to step 301 in Embodiment 2, and the details are not repeated herein.

802: The MME establishes an IP header replacement mapping according to the obtained fixed IP header information, where the IP header replacement mapping is correspondence between the fixed IP header information and a bearer.

Specifically, the IP header replacement mapping established by the MME according to the obtained fixed IP header information is the correspondence between the fixed IP header information and the bearer. The IP header replacement mapping is established to enable the UE to send a data packet, containing no fixed IP header information, on an indicated bearer in the subsequent communication process, thereby reducing the overhead and improving the user plane data transmission efficiency. Therefore, this embodiment does not limit the specific bearer corresponding to the fixed IP header information. In an actual application, for different bearers, fixed IP information may be different. In this case, if the MME obtains different fixed IP information, different IP header replacement mappings may be established according to the obtained fixed IP header information, and to facilitate subsequent communication with corresponding UEs according to the different IP header replacement mappings, the MME may store the established IP header replacement mapping in the form of a list, or store the established IP header replacement mapping in other forms. This embodiment does not limit the manner of establishing and storing the IP header replacement mapping by the MME.

803: The MME indicates, according to the fixed IP header information in the IP header replacement mapping, a bearer for the UE to send data, and receives a data packet which is sent by the UE on the indicated bearer and has no the fixed IP header information added.

In this step, after establishing the IP header replacement mapping, the MME does not adopt a manner of feeding back the established IP header replacement mapping to the UE, but only indicates a bearer for the UE to send data, so that the UE sends, on the indicated bearer, a data packet that has no the fixed IP header information added, which also achieves the purpose of saving the overhead and increasing the transmission rate. In addition, the method provided by this embodiment also supports a data compression manner, and this embodiment does not limit the specific compression manner adopted herein, for example, the UE adopts a PDCP compression technology to compress a data packet to be sent, and sends, on the indicated bearer, the compressed data packet to the MME, thereby further reducing the overhead and improving the user plane data transmission efficiency.

804: The MME queries the IP header replacement mapping according to the bearer for the UE to send the data packet, to obtain the fixed IP header information corresponding to the data packet sent by the UE.

Specifically, because the data packet sent by the UE is sent on the bearer indicated by the MME, the MME can determine the fixed IP header information corresponding to the bearer when indicating the bearer to the UE, and therefore, when the MME receives the data packet sent by the UE on the indicated bearer, the MME queries the IP header replacement mapping according to the bearer for the UE to send the data packet, to determine and obtain the fixed IP header information corresponding to the data packet sent by the UE. If the UE compresses the data packet in step 803, the MME further needs to decompress the received data packet. This embodiment does not limit the specific decompression manner.

It should be noted that, to ensure the correspondence between the bearer indicated by the MME to the UE and the fixed IP header information, the method provided by this embodiment is applicable to a case that one bearer merely sends data to the same IP address.

805: The MME adds the corresponding fixed IP header information in the data packet sent by the UE, and forwards the data packet to another network node.

In this step, after the MME determines the fixed IP header information corresponding to the data packet sent by the UE, to enable another network node to learn the fixed IP header information corresponding to the data packet sent by the UE, before forwarding the data packet sent by the UE to the another network node, the MME needs to add the corresponding fixed IP header information in the data packet sent by the UE, and then forward the data packet to the another network node. This embodiment does not specifically limit the another network node.

It should be noted that, the foregoing method may be implemented based on a UE attach process, that is, when obtaining the fixed IP header information which is bound to the UE, the MME may obtain, from the UE, the fixed IP header information which is bound to the UE, when the UE initiates an attach request. Optionally, in addition to the UE attach process, the foregoing method may also be implemented based on another process, for example, based on a dedicated bearer setup process, so that when obtaining the fixed IP header information which is bound to the UE, the MME may obtain, from the UE and in the dedicated bearer process, the fixed IP header information which is bound to the UE.

Further, in addition to the MME, the network node which establishes the IP header replacement mapping and performs data transmission with the UE according to the established IP header replacement mapping may also be an eNB, the implementation process of which is similar to the method provided by this embodiment, so the details are not repeated herein. If the network node that establishes the IP header replacement mapping is an eNB, when obtaining the fixed IP header information which is bound to the UE, the eNB can multiplex an existing RRC message or a new RRC message to carry the fixed IP header information, for example, an RRC connection setup complete message is used in the uplink, and an RRC connection reconfiguration message is used in the downlink.

Optionally, in the method provided by this embodiment, in addition to establishing the IP header replacement mapping, the MME can perform data transmission with the UE through the IP header replacement mapping and can also send the established IP header replacement mapping to another network node, so that the another network node performs data transmission with the UE according to the IP header replacement mapping established by the MME, and the MME does not need to recover an index in the data packet sent by the UE to a corresponding fixed IP header information and then forward the fixed IP header information to the another network node. When the another network node performs data transmission with the UE according to the IP header replacement mapping established by the MME, the specific implementation manner is similar to the execution process of the MME in step 803 to step 805 of this embodiment, and the details are not repeated herein.

In the method provided by this embodiment, the network node establishes the IP header replacement mapping according to the obtained fixed IP header information which is bound to the UE, so, compared with an existing manner of configuring the mapping by an MTC server or manually, the method is more flexible and can reduce difficulty in configuring and maintaining the IP header replacement mapping; moreover, by expanding an entity for maintaining the IP header replacement mapping from an eNB in the prior art to a network node such as a PGW or an eNB or an SGW, flexibility in obtaining the IP header replacement mapping is further improved and the implementation manner becomes more universal.

Embodiment 6

Figure 9:
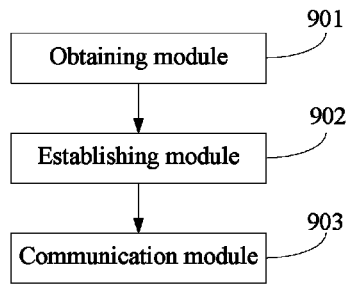
FIG. 9 is a schematic structural diagram of a network node according to Embodiment 6 of the present invention.

This embodiment provides a network node, which is an MME or an eNB or a PGW or an SGW. Referring to FIG. 9, the network node includes:

an obtaining module 901, configured to obtain fixed IP header information which is bound to a UE;

an establishing module 902, configured to establish an IP header replacement mapping according to the fixed IP header information obtained by the obtaining module 901, where the IP header replacement mapping is correspondence between the fixed IP header information and an index or a bearer; and a communication module 903, configured to perform data transmission with the UE according to the IP header replacement mapping established by the establishing module 902.

When the network node is an MME or an eNB, the obtaining module 901 is configured to obtain, from the UE or an HSS, the fixed IP header information which is bound to the UE.

When the network node is a PGW or an SGW or an eNB, the obtaining module 901 is configured to receive the fixed IP header information sent by an MME after the MME obtains, from the UE or an HSS, the fixed IP header information which is bound to the UE.

Further, the obtaining module 901 is configured to, when the UE initiates an attach request or a dedicated bearer setup process, obtain, from the UE, the fixed IP header information which is bound to the UE.

Further, the obtaining module 901 is configured to receive fixed IP header information which is bound to the UE and actively reported by the UE, or after querying the UE, receive fixed IP header information which is bound to the UE and reported by the UE.

Specifically, when the node is an MME, the communication module 903 is configured to send the IP header replacement mapping to another network node, so that the another network node performs data transmission with the UE according to the IP header replacement mapping.

Figure 10:
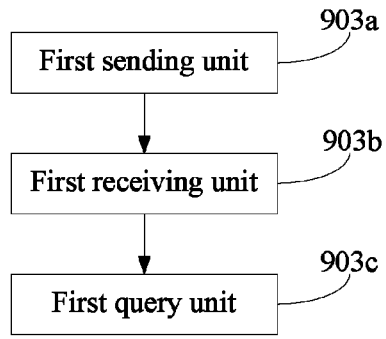
FIG. 10 is a schematic structural diagram of a communication module according to Embodiment 6 of the present invention.

Optionally, referring to FIG. 10, when the IP header replacement mapping established by the establishing module 902 is correspondence between the fixed IP header information and an index, the communication module 903 includes:

a first sending unit 903a, configured to send the IP header replacement mapping established by the establishing module 902 to the UE;

a first receiving unit 903b, configured to receive a data packet sent by the UE after the UE replaces the corresponding fixed IP header information with the index in the IP header replacement mapping sent by the first sending unit 903a; and a first query unit 903c, configured to query the IP header replacement mapping according to the index in the data packet which is sent by the UE and received by the first receiving unit 903b, to obtain the fixed IP header information corresponding to the data packet sent by the UE.

Figure 11:
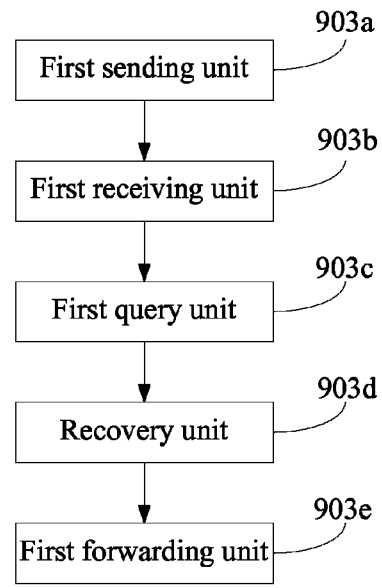
FIG. 11 is a schematic structural diagram of another communication module according to Embodiment 6 of the present invention.

Further, referring to FIG. 11, the communication module 903 further includes:

a recovery unit 903d, configured to recover the index in the data packet sent by the UE to the corresponding fixed IP header information obtained through query by the first query unit 903c; and a first forwarding unit 903e, configured to forward, to another network node, the data packet recovered by the recovery unit 903d.

Figure 12:
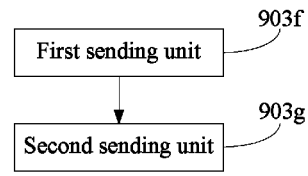
FIG. 12 is a schematic structural diagram of another communication module according to Embodiment 6 of the present invention.

Optionally, referring to FIG. 12, when the IP header replacement mapping established by the establishing module 902 is correspondence between the fixed IP header information and an index, the communication module 903 includes:

a first sending unit 903f, configured to send the IP header replacement mapping established by the establishing module 902 to the UE; and a second sending unit 903g, configured to send, to the UE, a data packet where the corresponding fixed IP header information is replaced with the index in the IP header replacement mapping, so that the UE queries, according to the index in the received data packet, the IP header replacement mapping sent by the first sending unit 903f, to obtain the fixed IP header information corresponding to the received data packet.

Figure 13:
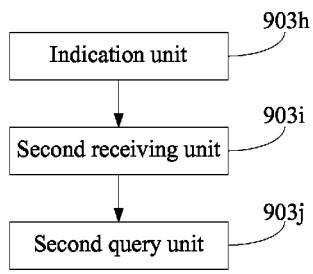
FIG. 13 is a schematic structural diagram of another communication module according to Embodiment 6 of the present invention.

Optionally, referring to FIG. 13, when the IP header replacement mapping established by the establishing module 902 is correspondence between the fixed IP header information and a bearer, the communication module 903 includes:

an indication unit 903h, configured to indicate, according to the IP header replacement mapping established by the establishing module 902, a bearer for the UE to send data;

a second receiving unit 903i, configured to receive a data packet which is sent by the UE on the bearer indicated by the indication unit 903h and has no fixed IP header information added; and a second query unit 903j, configured to query the IP header replacement mapping according to the bearer for the UE to send the data packet, to obtain the fixed IP header information corresponding to the data packet which is sent by the UE and received by the second receiving unit 903*i*.

Figure 14:
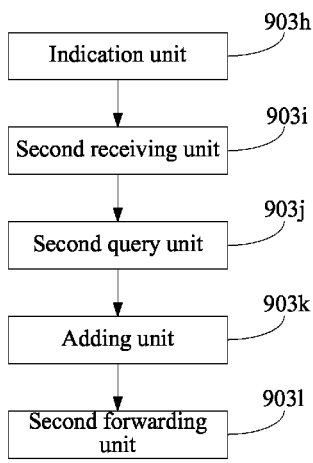
FIG. 14 is a schematic structural diagram of another communication module according to Embodiment 6 of the present invention.

Further, referring to FIG. 14, the communication module 903 further includes:

an adding unit 903*k*, configured to add, in the data packet which is sent by the UE and received by the second receiving unit 903*i*, the corresponding fixed IP header information obtained through query by the second query unit 903*j*; and a second forwarding unit 903*l*, configured to forward, to another network node, the data packet after being added with the fixed IP header information by the adding unit 903*k*.

The network node provided by this embodiment establishes the IP header replacement mapping according to the obtained fixed IP header information, so, compared with an existing manner of configuring the mapping by an MTC server or manually, the network node is more flexible and can reduce difficulty in configuring and maintaining the IP header replacement mapping; moreover, the network node provided by this embodiment for maintaining the IP header replacement mapping may be an eNB, and may also be an MME, or a PGW, or an SGW, so that the flexibility in obtaining the IP header replacement mapping is further improved and the implementation manner becomes more universal.

It should be noted that, when the network node provided by the embodiment obtains the IP header replacement mapping, the division of the foregoing functional modules is taken as an example for illustration. In an actual application, the above function may be assigned, according to requirements, to different modules for implementation, that is, the internal structure of the network node is divided into different functional modules, so as to complete all or a part of the functions described above. Moreover, the network node and the method for obtaining an Internet protocol header replacement mapping provided by the foregoing embodiments belong to the same concept, and for the specific implementation processes thereof, reference may be made to the method embodiments, and the details are not repeated herein.

Persons of ordinary skill in the art should understand that all or a part of the steps in the method of the embodiments may be completed through hardware or through a program instructing related hardware. The program may be stored in a computer readable storage medium including a read-only memory, a magnetic disk, an optical disk, or the like.

The above descriptions are merely preferred embodiments of the present invention, but are not intended to limit the present invention. Any modification, equivalent replacement, or improvement made without departing from the spirit and principle of the present invention shall fall within the protection scope of the present invention.

What is claimed is:

1. A method for obtaining an Internet protocol header replacement mapping, comprising:

obtaining, by a network node, fixed Internet protocol (IP) header information which is information from a fixed part of content of an IP header bound to a user equipment (UE) in response to a connection attach request or a dedicated bearer setup process of the UE to perform data communication with the network node, the network node is any one of a mobility management entity (MME) or an evolved base station (eNB) or a packet data network gateway (PGW) or a serving gateway (SGW);

establishing an IP header replacement mapping according to the fixed IP header information, wherein the IP header replacement mapping is correspondence between the fixed IP header information and an index or a bearer; and performing the data communication with the UE according to the IP header replacement mapping.

2. The method according to claim 1, wherein when the network node is an MME or an eNB, the obtaining the fixed IP header information which is bound to the user equipment UE comprises:

obtaining, from the UE or a home subscriber server (HSS), the fixed IP header information which is bound to the UE; or when the network node is a PGW or an SGW or an eNB, the obtaining the fixed Internet protocol IP header information which is bound to the user equipment UE comprises:

receiving the fixed IP header information sent by an MME after the MME obtains, from the UE or a home subscriber server HSS, the fixed IP header information which is bound to the UE.

3. The method according to claim 2, wherein the obtaining, from the UE, the fixed IP header information which is bound to the UE comprises:

when the UE initiates the attach request or the dedicated bearer setup process, obtaining, from the UE, the fixed IP header information which is bound to the UE.

4. The method according to claim 2, wherein the obtaining, from the UE, the fixed IP header information which is bound to the UE comprises:

receiving the fixed IP header information which is bound to the UE and actively reported by the UE, or after querying the UE, receiving the fixed IP header information which is bound to the UE and reported by the UE.

5. The method according to claim 1, wherein when the network node is an MME, the performing data communication with the UE according to the IP header replacement mapping comprises:

sending the IP header replacement mapping to another network node, so that the another network node performs data communication with the UE according to the IP header replacement mapping.

6. The method according to claim 1, wherein when the IP header replacement mapping is correspondence between the fixed IP header information and an index, the performing data communication with the UE according to the IP header replacement mapping comprises:

sending the IP header replacement mapping to the UE, and receiving a data packet sent by the UE after the UE replaces the corresponding fixed IP header information with the index in the IP header replacement mapping; and querying the IP header replacement mapping according to the index in the data packet sent by the UE, to obtain the fixed IP header information corresponding to the data packet sent by the UE.

7. The method according to claim 6, wherein after the obtaining the fixed IP header information corresponding to the data packet sent by the UE, the method further comprises:

recovering the index in the data packet sent by the UE to the corresponding fixed IP header information, and forwarding the fixed IP header information to another network node.

8. The method according to claim 1, wherein when the IP header replacement mapping is correspondence between the fixed IP header information and an index, the performing data communication with the UE according to the IP header replacement mapping comprises:

sending the IP header replacement mapping to the UE, and sending, to the UE, a data packet where the corresponding fixed IP header information is replaced with the index in the IP header replacement mapping, so that the UE queries the IP header replacement mapping according to the index in the received data packet, to obtain the fixed IP header information corresponding to the received data packet.

9. The method according to claim 1, wherein when the IP header replacement mapping is correspondence between the fixed IP header information and a bearer, the performing data communication with the UE according to the IP header replacement mapping comprises:

indicating, according to the IP header replacement mapping, a bearer for the UE to send data, and receiving a data packet which is sent by the UE on the indicated bearer and has no fixed IP header information added; and querying the IP header replacement mapping according to the bearer for the UE to send the data packet, to obtain the fixed IP header information corresponding to the data packet sent by the UE.

10. The method according to claim 9, wherein after the obtaining the fixed IP header information corresponding to the data packet sent by the UE, the method further comprises:

adding the corresponding fixed IP header information in the data packet sent by the UE, and forwarding the data packet to another network node.

11. A network node, wherein the network node is a mobility management entity (MME) or an evolved base station (eNB) or a packet data network gateway (PGW) or a serving gateway (SGW), and comprises:

non-transitory computer readable storage medium to store a program; and computer hardware configured, including configured by the program, to:

obtain fixed Internet protocol (IP) header information which is information from a fixed part of content of an IP header bound to a user equipment (UE) in response to a connection attach request or a dedicated bearer setup process of the UE to perform data communication with the UE;

establish an IP header replacement mapping according to the obtained fixed IP header information, wherein the IP header replacement mapping indicates correspondence between the fixed IP header information and an index or a bearer; and perform the data communication with the UE according to the established IP header replacement mapping.

12. The node according to claim 11, wherein when the network node is an MME or an eNB, the computer hardware is configured to obtain, from the UE or a home subscriber server HSS, fixed IP header information which is bound to the UE; or when the network node is a PGW or an SGW or an eNB, the computer hardware is configured to receive the fixed IP header information sent by an MME after the MME obtains, from the UE or a home subscriber server (HSS), the fixed IP header information which is bound to the UE.

13. The node according to claim 12, wherein the computer hardware is configured to, when the UE initiates an attach request or a dedicated bearer setup process, obtain, from the UE, the fixed IP header information which is bound to the UE.

14. The node according to claim 12, wherein the computer hardware is configured to receive fixed IP header information which is bound to the UE and actively reported by the UE, or after querying the UE, receive fixed IP header information which is bound to the UE and reported by the UE.

15. The node according to claim 11, wherein when the node is an MME, the computer hardware is configured to send the IP header replacement mapping to another network node, so that the another network node performs data communication with the UE according to the IP header replacement mapping.

16. A network node, wherein the network node is a mobility management entity (MME) or an evolved base station (eNB) or a packet data network gateway (PGW) or a serving gateway (SGW), and comprises:

non-transitory computer readable storage medium to store a program; and computer hardware configured, including configured by the program, to:

obtain fixed Internet protocol (IP) header information corresponding to a user equipment (UE);

establish an IP header replacement mapping according to the obtained fixed IP header information, wherein the IP header replacement mapping indicates correspondence between the fixed IP header information and an index or a bearer; and perform data transmission with the UE according to the established IP header replacement mapping, wherein when the established IP header replacement mapping is correspondence between the fixed IP header information and an index, the computer hardware is configured to:

send the established IP header replacement mapping;

receive a data packet sent by the UE after the UE replaces the corresponding fixed IP header information with the index in the sent IP header replacement mapping; and query the IP header replacement mapping according to the index in the received data packet which is sent by the UE, to obtain the fixed IP header information corresponding to the data packet sent by the UE.

17. The node according to claim 16, wherein the computer hardware is configured to:

recover the index in the data packet sent by the UE to the corresponding fixed IP header information obtained through the query; and forward, to another network node, the recovered data packet.

18. A network node, wherein the network node is a mobility management entity (MME) or an evolved base station (eNB) or a packet data network gateway (PGW) or a serving gateway (SGW), and comprises:

non-transitory computer readable storage medium to store a program; and computer hardware configured, including configured by the program, to:

obtain fixed Internet protocol (IP) header information corresponding to a user equipment (UE);

establish an IP header replacement mapping according to the obtained fixed IP header information, wherein the IP header replacement mapping indicates correspondence between the fixed IP header information and an index or a bearer; and perform data transmission with the UE according to the established IP header replacement mapping, wherein when the established IP header replacement mapping is correspondence between the fixed IP header information and an index, the computer hardware is configured to:

send the established IP header replacement mapping to the UE; and send, to the UE, a data packet where the corresponding fixed IP header information is replaced with the index in the IP header replacement mapping, so that the UE queries, according to the index in the received data packet, the send IP header replacement mapping, to obtain the fixed IP header information corresponding to the received data packet.

19. A network node, wherein the network node is a mobility management entity (MME) or an evolved base station (eNB) or a packet data network gateway (PGW) or a serving gateway (SGW), and comprises:

non-transitory computer readable storage medium to store a program; and computer hardware configured, including configured by the program, to:

obtain fixed Internet protocol (IP) header information corresponding to a user equipment (UE);

establish an IP header replacement mapping according to the obtained fixed IP header information, wherein the IP header replacement mapping indicates correspondence between the fixed IP header information and an index or a bearer; and perform data transmission with the UE according to the established IP header replacement mapping, wherein when the established IP header replacement mapping is correspondence between the fixed IP header information and a bearer, the computer hardware is configured to:

indicate, according to the established IP header replacement mapping, a bearer for the UE to send data;

receive a data packet which is sent by the UE on the indicated bearer and has no fixed IP header information added; and query the IP header replacement mapping according to the bearer for the UE to send the data packet, to obtain the fixed IP header information corresponding to the received data packet which is sent by the UE.

20. The node according to claim 19, wherein the computer hardware is configured to:

add, in the received data packet which is sent by the UE, the corresponding fixed IP header information obtained through the query; and forward, to another network node, the data packet after being added with the fixed IP header information.

* * * * *

UNITED STATES PATENT AND TRADEMARK OFFICE
CERTIFICATE OF CORRECTION

PATENT NO. : 9,560,175 B2  
APPLICATION NO. : 14/310428  
DATED : January 31, 2017  
INVENTOR(S) : Yue Li et al.

Page 1 of 1

It is certified that error appears in the above-identified patent and that said Letters Patent is hereby corrected as shown below:

On the Title Page

Item (73), Assignee's Address:
Delete "Suwon-si (KR)" and insert -- Shenzhen (CN) --, therefor.

Signed and Sealed this
Sixth Day of June, 2017

Michelle K. Lee
*Director of the United States Patent and Trademark Office*